United States Patent [19]

Krüschwitz

[11] Patent Number: 4,621,469
[45] Date of Patent: Nov. 11, 1986

[54] WINDOW GLASS FIXTURE ARRANGEMENTS

[75] Inventor: Werner Krüschwitz, Viersen, Fed. Rep. of Germany

[73] Assignee: Draftex Industries Limited, Edinburgh, Scotland

[21] Appl. No.: 629,721

[22] Filed: Jul. 11, 1984

[30] Foreign Application Priority Data

Jul. 26, 1983 [GB] United Kingdom ............... 8320059

[51] Int. Cl.⁴ .............................................. E06B 3/62
[52] U.S. Cl. ...................................... 52/208; 52/397; 52/716
[58] Field of Search .......................... 52/208, 397, 716

[56] References Cited

U.S. PATENT DOCUMENTS

| | | | |
|---|---|---|---|
| 3,150,421 | 9/1964 | Lickert | 52/208 |
| 3,968,612 | 7/1976 | Endo et al. | 52/400 |
| 4,246,303 | 1/1981 | Townsend | 52/716 X |
| 4,347,693 | 9/1982 | Kruschwitz | 52/716 X |
| 4,458,459 | 7/1984 | Irrgang | 52/208 |
| 4,483,113 | 11/1984 | Kruschwitz | 52/208 |

FOREIGN PATENT DOCUMENTS

| | | |
|---|---|---|
| 0079839 | 5/1983 | European Pat. Off. . |
| 1129273 | 5/1962 | Fed. Rep. of Germany ........ 52/397 |
| 3046457 | 7/1982 | Fed. Rep. of Germany . |
| 2520428 | 7/1983 | France . |
| 705945 | 3/1954 | United Kingdom ................. 52/397 |
| 2142685 | 6/1956 | United Kingdom . |
| 750023 | 6/1956 | United Kingdom . |
| 1132140 | 10/1968 | United Kingdom . |
| 2114200 | 8/1983 | United Kingdom ................. 52/208 |

*Primary Examiner*—J. Karl Bell
*Attorney, Agent, or Firm*—Leydig, Voit & Mayer

[57] ABSTRACT

A windshield mounting arrangement comprises foamed PVC material or the like integral with softer PVC material defining a channel. The channel has inner lips which mount the arrangement on a mounting flange. The soft material defines a ledge-shaped surface for receiving the windshield glass. The glass is secured in position by adhesive in a channel adjacent the ledge and also by a stiff fixing member which locks into a slot below the ledge.

7 Claims, 1 Drawing Figure

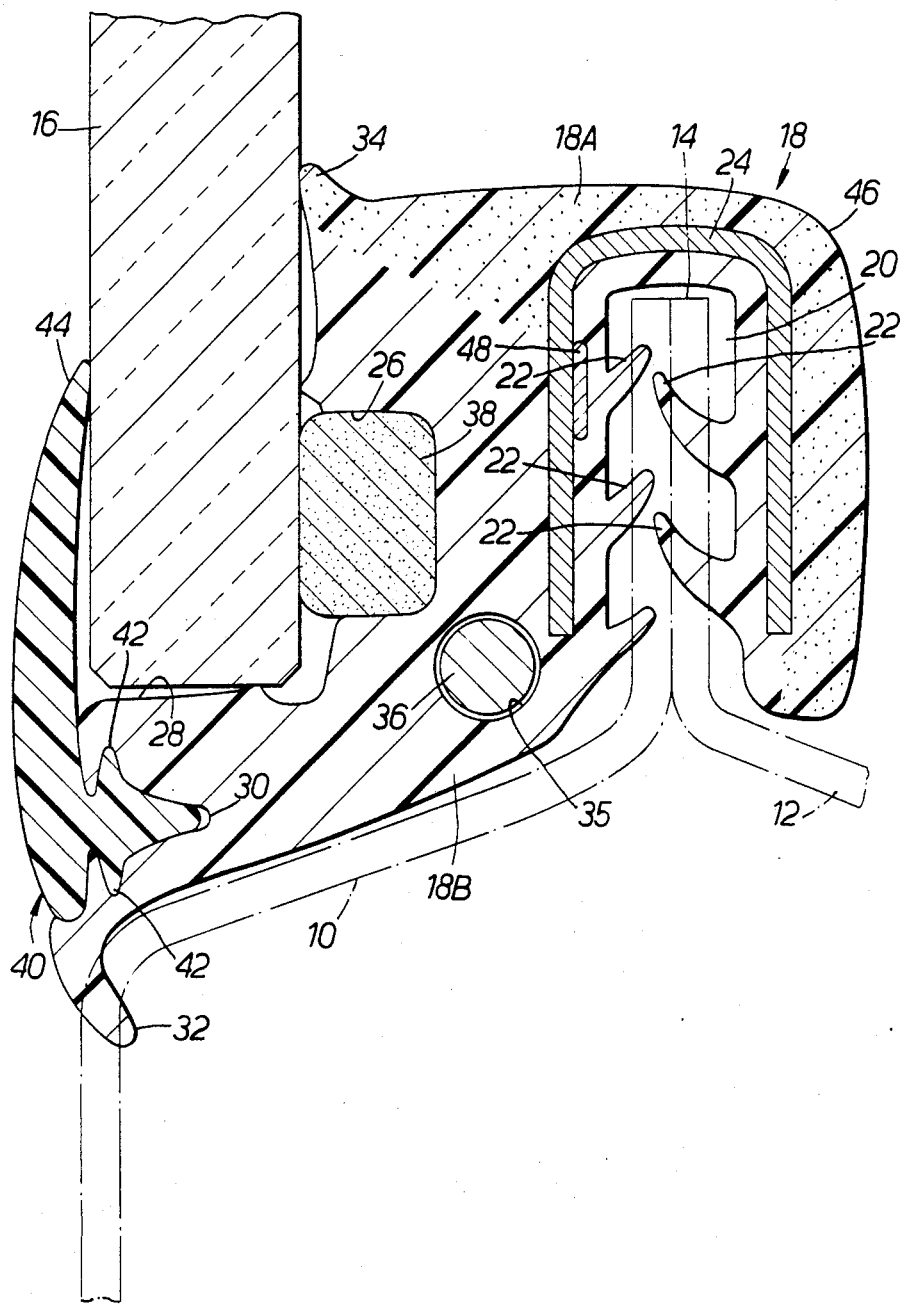

WINDOW GLASS FIXTURE ARRANGEMENTS

BACKGROUND OF THE INVENTION

The invention relates to arrangements for securing window glass in position in a window frame or opening. For example, the invention may be applied to the securing of window glass in position in a motor vehicle body, though is not limited to such application.

SUMMARY OF THE INVENTION

According to the invention, there is provided a window glass mounting and fixing arrangement, comprising soft flexible material defining a channel for embracing mounting means running around the window opening and also defining a surface of the flexible material adapted to receive the window glass, the said surface being recessed to receive adhesive for securing the window glass in position against the said surface, and means for securing a relatively stiff member to the flexible material so as to make contact with the external surface of the window glass to assist in holding the window glass in position.

According to the invention, there is also provided a window glass fixing arrangement, comprising soft flexible material defining a longitudinal channel reinforced by an embedded metal carrier and for embracing a mounting flange running around the window opening, the material also defining a ledge-shaped longitudinally extending surface positioned to receive a peripheral portion of the inside surface of the window glass and the peripheral edge thereof, that part of the said surface receiving the peripheral portion of the inside surface of the window glass defining a longitudinally running channel in which is contained adhesive for adhesively securing the window glass in position, and a longitudinally running slot in the flexible material adjacent to the remaining portion of the said surface, with a stiffening member adapted to be secured in the said slot and having a leaf which makes contact with the peripheral portion of the outside surface of the window glass to assist in holding the window glass in position.

DESCRIPTION OF DRAWINGS

A window glass fixing arrangement embodying the invention will now be described, by way of example only, with reference to the accompanying diagrammatic drawing which is a cross-section through the arrangement.

DESCRIPTION OF PREFERRED EMBODIMENTS

The fixture to be described is for securing a windscreen in position in a motor vehicle body. It could also be used for securing any other fixed glass window pane in position in a motor vehicle body. With modification, it could be used for securing window glass in position in other applications.

The Figure shows a cross-section through a motor vehicle body along the base of a windscreen opening, the body in this area having two portions (shown dotted) 10 and 12 which meet to form a flanged joint 14 which runs around the windscreen opening lying parallel to and just inside the actual plane of the windscreen opening which is indicated by the window glass 16. The arrangement is made from soft flexible material 18, such as rubber or polyvinyl chloride (PVC) 18. This is shaped to define a channel 20 from whose opposite facing walls gripping lips 22 extend. As shown in the Figure there are three such lips on one channel wall and two relatively larger lips on the opposite channel wall but other arrangements of number and size of lips are possible.

A metal carrier 24 is completely embedded in the material 18 and is generally channel-shaped to embrace the channel opening 20. The metal carrier may be of any suitable form. For example, it may be made of U-shaped elements arranged side-by-side and either connected to each other by short connecting links or completely disconnected. Instead, it may be made of looped wire.

The carrier 24 is advantageously incorporated in the flexible material 18 by means of a cross-head extrusion process.

The extrusion process is advantageously one which produces the soft material 18 in two different consistencies as shown at 18A and 18B respectively; the two different consistencies are indicated by different cross-hatching in the Figure, though it is emphasized that they are advantageously co-extruded. The gripping lips 22 are extruded integrally with the material 18A and 18B. The materials of the different consistencies may have different colours.

In one advantageous arrangement, the material 18A is foamed PVC, while the material 18B is not foamed but is relatively soft.

The soft PVC material 18B defines a longitudinal channel 26 and a ledge 28. The portion of the material defining the ledge 28 also defines a longitudinal slot 30 and a lip 32.

The foamed PVC material 18A defines a lip, 34, also.

The arrangement as so far described may be manufactured in a length which is sufficient to run around the entire windscreen opening. Advantageously, such a length could be joined to itself to form a continuous loop sized to fit a particular windscreen opening and delivered to the vehicle manufacturer as such. However, this is not essential.

If a continuous loop is formed, advantageously the soft PVC material 18B is provided with a through bore 35 in which is positioned a relatively stiff wire 36 which is such as to hold the complete loop in the correct shape for fitting to the particular windscreen opening.

In use, an adhesive 38 is placed in position in the channel 26 along the complete length of the fixture and the latter is placed in position in the windscreen opening by fitting the channel 20 over the flanged joint 14. The windscreen glass 16 is then placed in position on the ledge 28 so as to come into contact with the adhesive 38 which adhesively secures it in position.

A relatively stiff filler strip 40 is then placed in position in the slot into which it interlocks by virtue of tongues 42. This strip 40 has a leaf-shaped portion 44 which engages the peripheral edge of the windscreen glass 16 and provides additional securing for the glass. In addition, the presence of the strip within the slot 30 forces the surface of the ledge into contact with the peripheral edge of the glass and provides further security for the glass.

The lip 32 provides a seal against the body portion 10 and the lip 34 provides a seal against the inside surface of the glass 16.

The filler strip 40 may be provided with an external visible bright metal trim for decorative purposes.

It will be apparent that the arrangement described provides a very simple yet secure method of fitting a windscreen or similar glass in position. In particular, the arrangement is especially suitable for use in conjunction with robot-fixing means in that it can relatively easily be placed in a position on the flange joint automatically and permits the windscreen glass to be fitted automatically as well.

The arrangement is also advantageous in that it enables the windscreen glass 16 to be fitted so that its external surface is substantially flush with the external surface of the body portion 10, thus reducing wind resistance.

The surface 46 of the foamed PVC 18A maybe "printed" with a decorative pattern.

The carrier may have a longitudinally inextensible tape 48 associated with it to prevent inadvertent stretching of the carrier during assembly on to the vehicle body.

The adhesive may be of a type which becomes activated when heated.

What is claimed is:

1. A window glass mounting and fixing arrangement, comprising
    soft flexible material defining a channel for embracing mounting means running around the window opening and defining a ledge-shaped surface of the flexible material adapted to receive the window glass, the said surface having a first portion for making contact with a side surface of the window glass and which is recessed to receive adhesive for adhering to and securing the window glass in position on the said ledge-shaped surface and a second portion for making contact with the peripheral edge of the window glass, and
    a relatively stiff glass-supporting member, the glass-supporting member having a part which is inserted into a longitudinal slot defined in the flexible material adjacent to the said second portion of the ledge-shaped surface, whereby to mechanically interlock the glass-supporting member with the flexible material so that the glass-supporting member makes contact with the side surface of the window glass which is opposite to the side surface which contacts the said first portion of the ledge-shaped surface and thereby assists in holding the window glass in position, and whereby the insertion of the said part of the glass-supporting member into the longitudinal slot forces the second portion of the ledge-shaped surface into contact with the peripheral edge of the window glass.

2. An arrangement according to claim 1, including an embedded channel-shaped carrier which reinforces the said channel.

3. An arrangement according to claim 1, formed into a complete loop sized and shaped to match the window opening.

4. An arrangement according to claim 3, including a stiffening wire embedded within the soft flexible material.

5. An arrangement according to claim 1, in which the soft flexible material is of two different consistencies, the material of one consistency being relatively softer than the other and defining the said channel and the said surface and the material of the other said consistency being foamed and embracing the material of the said one consistency.

6. An arrangement according to claim 5, in which the materials of the two different consistencies are of different colours.

7. A window glass fixing arrangement, comprising
    soft flexible material defining a longitudinal channel reinforced by an embedded metal carrier and for embracing a mounting flange running around the window opening,
    the material also defining a ledge-shaped longitudinally extending surface positioned to receive a peripheral portion of the inside surface of the window glass and the peripheral edge thereof,
    that part of the said surface receiving the peripheral portion of the inside surface of the window glass defining a longitudinally running channel in which is contained adhesive for adhesively securing the window glass in position,
    means defining a longitudinally running slot in the flexible material adjacent to the remaining portion of the said surface, and
    a stiffening member having a part adapted to be secured in the said slot and having a leaf which makes contact with the peripheral portion of the outside surface of the window glass to assist in holding the window glass in position, the said part of the stiffening member being so sized that when inserted into the said slot it forces the flexible material defining the said remaining portion of the said surface into contact with the peripheral edge of the window glass.

* * * * *